Sept. 15, 1970    KAZUTSUGU KOBAYASHI ET AL    3,529,220

BRUSHLESS DC MOTOR

Filed March 21, 1968      3 Sheets-Sheet 1

INVENTORS
KAZUTSUGU KOBAYASHI
HISAYUKI MATSUMOTO

BY *Wenderoth, Lind & Ponack*

ATTORNEYS

Sept. 15, 1970  KAZUTSUGU KOBAYASHI ET AL  3,529,220
BRUSHLESS DC MOTOR
Filed March 21, 1968                                          3 Sheets-Sheet 2

INVENTORS
KAZUTSUGU KOBAYASHI
HISAYUKI MATSUMOTO

BY Wenderoth, Lind & Ponack
ATTORNEY

United States Patent Office 3,529,220
Patented Sept. 15, 1970

3,529,220
BRUSHLESS DC MOTOR
Kazutsugu Kobayashi and Hisayuki Matsumoto, Osaka, Japan, assignors to Matsushita Electric Industrial Co. Ltd., Osaka, Japan
Filed Mar. 21, 1968, Ser. No. 715,014
Claims priority, application Japan, Mar. 24, 1967, 42/18,763
Int. Cl. H02k 29/00
U.S. Cl. 318—138                    4 Claims

ABSTRACT OF THE DISCLOSURE

A direct current motor which has no commutator or brushes. The motor has a permanently magnetized rotor on an output shaft and a plurality of windings in the stator. An energizing circuit is coupled to the windings to produce a field to cause the rotor to rotate. The energizing circuit has gate controlled switching devices therein which are actuated by energy transducers, which in turn operate by a disc coupled to the rotor and rotate in synchronism with the rotor. Control means is also provided in the energizing to control the energizing time for the stator windings.

---

This invention relates to direct current motors, and more particularly to direct current motors of the kind having a permanently magnetized rotor and a wound stator.

Direct current motors including a commutator and brushes have many advantages, such as a large range of variable speeds or a high output in spite of their small capacity, but they also have some well-known disadvantages such as, for example, creating electronic impulse noise and a relatively short life.

It is an object of the present invention to provide a direct current motor which has no brushes and commutator, thereby obviating the above disadvantages. It is a further object to provide a direct current motor having means controlling the input power in order to keep the rotating speed constant without any undesired power dissipation.

The direct current motor according to the present invention comprises a permanently magnetized rotor rigidly secured to an output shaft, a wound stator having a plurality of windings, each winding being associated with an energizing circuit which is controlled by gate controlled switching device, and energy transducer supplying a triggering signal to said gate controlled switching device, and a disc rotated in synchronism with said rotor by said output shaft, said disc controlling the supply of energy to each of said energy transducers which are coupled with said disc in such manner that for any position of said rotor, one of said energy transducers is energized to supply a triggering signal to a gate controlled switching device to energize a rotor winding to produce a field causing said rotor to rotate.

Furthermore, the direct current motor according to the invention comprises an auxiliary gate controlled switching device for limiting the time said gate controlled switching device is conductive to enable adjusting the resulting rotating speed of said rotor.

The expression "gate controlled switching device" as used herein means as multi-junction semi-conductor device having a controlling electrode which controls the flow of current through the device, for example, a thyristor or bi-directional thyristor, and the expression "energy transducer" means a device for converting energy of one kind into energy of another, e.g. magnetic energy into electric energy. In the disclosed embodiments of the invention, said energy transducer is a high frequency transformer comprising primary and secondary windings, the primary winding being energized by high frequency current, and a magnetic core with an air gap in it, and the disc on the output shaft of the motor of the invention is made of magnetic material which is so shaped as to control the magnetic reluctance of said core and resultant coupling between the primary and secondary windings.

One embodiment of the present invention will now be described by way of example with reference to the accompanying drawings in which.

Figure 1:
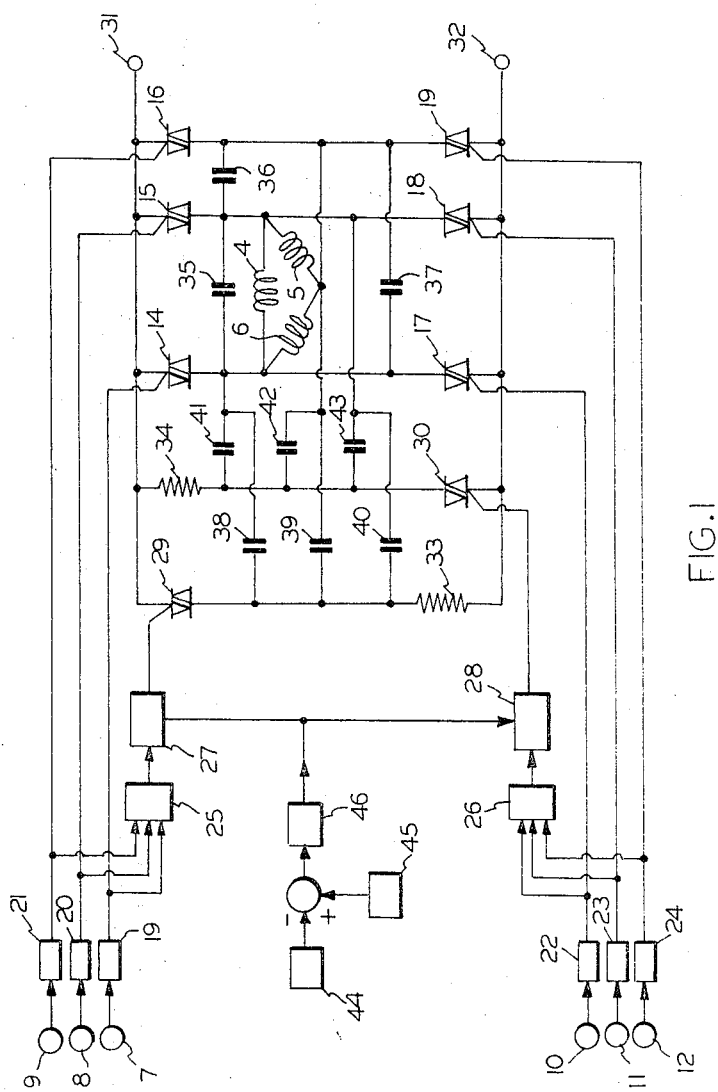
FIG. 1 is a circuit diagram of the connections of one embodiment of the direct current motor in accordance with the invention.
Figure 2:
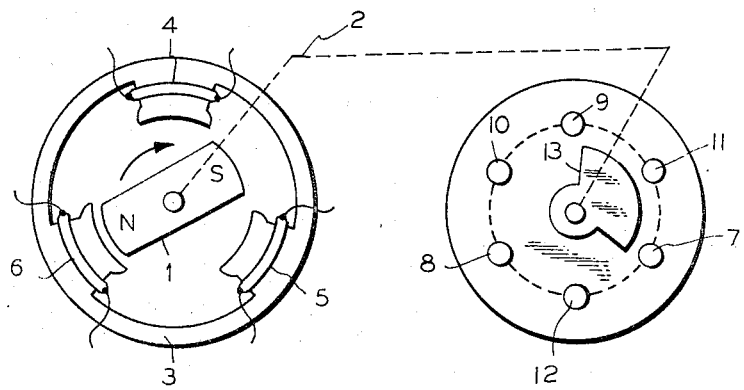
FIG. 2 shows the positional relationship between the rotor, windings, disc, and energy transducers of the motor of FIG. 1.

Referring now to FIGS. 1 and 2 of the drawings, the direct current motor according to the invention includes a permanently magnetized rotor 1 rigidly secured to an output shaft, schematically indicated at 2, and a wound stator 3 having three windings 4, 5 and 6. Energy transducers 7–12 are mounted around a semicircular disc 13 along a circle around said shaft, and disc 13 is secured to the shaft in a fixed positional relationship to the rotor, as shown in FIG. 2.

The electrical outputs of the transducers 7–12 are supplied to the gate electrodes of the respective gate controlled switching devices 14–19 through the differentiating circuits 19–24, respectively, which are inserted for shaping the outputs from the transducers to impulse signals for achieving sure and certain triggering of said gate controlled switching devices at the time when said transducers are coupled to said disc.

Simultaneously the outputs from said transducers through the differentiating circuits are added in an adding circuit 25 and 26, and supplied to gate electrodes of auxiliary gate controlled switching devices 29 and 30 through delaying circuits 27 and 28. A conventional logic circuit, called an OR-circuit, is available for use as this adding circuit.

Auxiliary gate controlled switching devices 29 and 30 are connected across electric power supply terminals 31 and 32 through the resistors 33 and 34 respectively.

Gate controlled switching devices 14–19 are paired in three pairs, 14 and 17, 15 and 18, and 16 and 19, and the two devices in each pair are in series and are connected across the electric power supply terminals 31 and 32. Stator windings 4, 5 and 6 are delta connected and the connection points are connected to the respective points of the paired switching devices.

Electric capacitors 35, 36 and 37 are for turning off the gate controlled switching devices 14–19 and are connected in parallel with the respective stator windings 4, 5 and 6.

Electric capacitors 38–43 are also for turning off the gate controlled switching devices, capacitors 38, 39 and 40 being connected between the connection points of the respective pairs of gate controlled switching devices and the connection point between the auxiliary gate controlled switching device 29 and resistor 33, and capacitors 41, 42 and 43 being connected between the connection point between the switching device 30 and resistor 34 and the connection points of the respective pairs of gate controlled switching devices. The electric current flowing through said resistors 33 and 34 is not very large compared with the current in said windings, and therefore the power dissipation in said resistors is very small.

The rotating speed or phase is detected and converted into electric output by a speed or phase detector 44 and this output is compared with the reference output from the reference signal generator 45 and applied to the delaying circuit in order to adjust the delaying time.

In this embodiment, the disc 13 which rotates in synchronism with the rotor 1, is secured to the shaft 2 in such a position that two of the energy transducers are always magnetically coupled to said disc, and as shown in FIG. 2, one of the energy transducers 7, 8 and 9 and one of the energy transducers 10, 11 and 12, which are in alternate positions along the circle of transducers are always coupled to said disc 13.

When the rotor is in the position as shown in FIG. 2, for example, energy transducers 7 and 11 are coupled to the disc 13 and the electrical outputs from those transducers are supplied to gate electrode of gate controlled switching devices 14 and 18 through differentiating circuits 19 and 23, said gate controlled switching devices 14 and 18 energize mainly the winding 4 and produce a field causing the rotor 1 to rotate in the clockwise direction as indicated by the arrow in FIG. 2.

When the rotor has rotated through approximately sixty degrees, energy transducer 12 is newly coupled to the disc and the output from the transducer 12 is supplied to the gate controlled switching device 19 through the differentiating circuit 14 which, together with the switching device 14, energizes mainly the winding 6 in the reverse direction, which in turn produces a field which rotates the rotor again.

In a similar manner, for each rotation of the rotor through approximately sixty degrees a different combination of the energy transducers and resultant gate controlled switching devices are energized and in turn energize the windings, thereby causing the rotor to rotate continuously.

Electric capacitors 35, 36 and 37 connected in parallel to windings 4, 5 and 6 cause the gate controlled switching devices to turn off. For example, when the gate controlled switching device 16 is turned on, the voltage across the capacitor 36 is applied to the gate controlled switching device 15, and because it is of the opposite sense, it causes the device 15 to be turned off.

When the speed or phase detector 44 is a speed detector, the speed of rotation of rotor 1 is detected and converted to an electric output by speed detector 44, and this output is compared with the output from the reference signal generator 45. The error signal, e.g. a signal proportional to the difference of these two outputs, is amplified by the amplifier 46 and applied to the delaying circuit 27 and 28 and controls the delaying time of the delaying circuit in proportion to the magnitude of the error signal. However, when the resultant delay time approaches the time interval of the output coming from the transducers through the differentiating and adding circuits, the delaying circuit is immediately cleared by the newly arriving output itself, i.e. this delaying circuit always gives a delaying effect to output coming from the transducers.

When the rotating speed is too high or the phase of the rotor leads too much, the output from the amplifier 46 decreases the delaying time of the delaying circuits 27 and 28. Then auxiliary gate controlled switching devices 29 and 30 are turned on and opposite voltages are applied across the capacitors 38–42 to gate controlled switching devices 14–19 and these gate controlled switching devices are turned off a short time after they are turned on.

Accordingly the length of time for which the stator windings are energized is shortened, and this causes the rotating torque and resultant speed to decrease or the phase to lag.

In quite the opposite manner, if the resultant torque and speed are caused to decrease or the phase is caused to lag, the delaying time of the circuits 37 and 28 increases, and when the delaying time exceeds the time interval of the output coming from the differentiating circuits to the delaying circuit, the auxiliary gate controlled switching devices are not turned on and windings are energized for the full time that the disc and the energy transducers are coupled.

As shown in the embodiment described above, according to this invention, rotating torque is easily controlled by adjusting the delaying time of the delaying circuit proportionally to the difference of the outputs from the detector and the reference signal generator according to the time during which the stator windings are energized.

Therefore, the rotating speed or phase are easily controlled automatically so as to be a predetermined speed or phase by setting up the system so that the detector and the reference signal generator give an output corresponding to the speed or phase of the rotor and the output corresponding to predetermined speed or phase, respectively.

Two combinations of a delaying circuit and an auxiliary gate controlled switching device, i.e. 27 with 29, and 28 with 30, are shown in FIG. 1. However, control of speed or phase can be achieved by a single combination, omitting the other.

Figure 3:
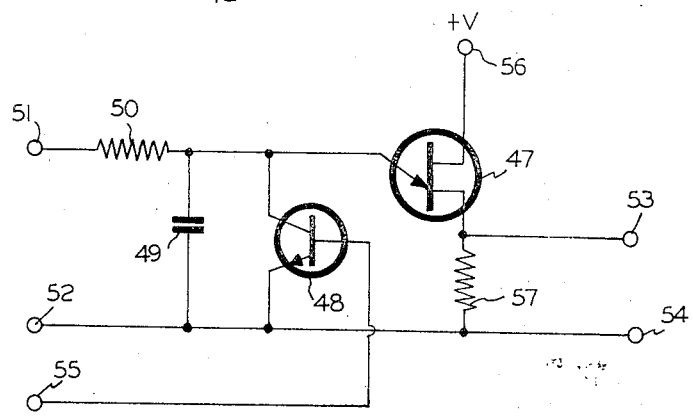
FIG. 3 is a circuit diagram of a delay circuit used in the motor of the present invention.

The circuit of FIG. 3 is one embodiment of said delaying circuits 27 and 28. The output from the amplifier 46 is applied to input terminals 51 and 52 and charges the electric capacitor 49 with the time-constant depending on the resistance and capacitance value of the resistor 50 and the capacitor 49.

Since the voltage across said capacitor 49 is applied to the emitter electrode of the semi-conductor device 47, the voltage at the emitter of said semi-conductor device 47 is linearly increased. Said semi-conductor device is a so-called "uni-junction transistor" and it becomes suddenly conductive and gives an impulsive output across the resistor 57 at the time when the voltage at the emitter reaches break-down voltage. This output impulse triggers said auxiliary gate controlled switching device, this output being connected to the gate electrode of said auxiliary gate controlled switching device through the terminals 53 and 54.

When the output from the amplifier 46 is large, said capacitor 49 is charged quickly and accordingly said uni-junction transistor 47 gives the triggering signal early, and gives the signal much later when the amplifier output is small.

The output from said adding circuit 25 or 26 is connected to the terminal 55 and applied to the base electrode of transistor 48 which is driven by the output coming from said adding circuit and discharges said capacitor 49 even if the triggering output has not yet appeared.

A conventional tachometer generator and AC generator can be utilized as said speed and phase detector, and a DC voltage generator and oscillator can be utilized as said reference signal generator, respectively. Furthermore, the phase of the rotor can be detected by monitoring and shaping the waveform of the voltage at the connecting point of each of the windings.

The motor described above may be modified in many ways. For example, an open loop speed control system can be utilized in which an independent control signal can be applied to the delaying circuit for adjusting the delaying time of the circuit and the length of time the windings are energized. Speed or phase control of the rotor can be achieved by controlling all of said gate controlled switching devices 14–19 or controlling only some of said gate controlled switching devices, e.g. 14, 15 and 16, or 17, 18 and 19. The time during which said gate controlled switching devices are energized can be controlled by providing six delaying circuits between said differentiating circuits 19–24 and the gate electrodes of said gate controlled switching devices 14–19, eliminating said delaying circuits 27 and 28 in FIG. 1. In this modification, delaying time must be decreased in order to increase the rotating torque and resultant speed of the rotor or cause the phase of the rotor to lead.

Other forms of energy transducers can be utilized. For example, the high-frequency transformer and magnetic disc can be replaced by a photo-electric cell and an associated light source, in which case said disc would be provided with a slot which controls the light falling on each cell from the associated light source.

Furthermore, there can be more or less than three stator windings shown in the drawing, in which case the number of transducers and the shape of the disc must be adjusted accordingly.

In the above described embodiment, bi-directional thyristors are used as gate controlled switching devices as shown in FIG. 1.

Figure 4:
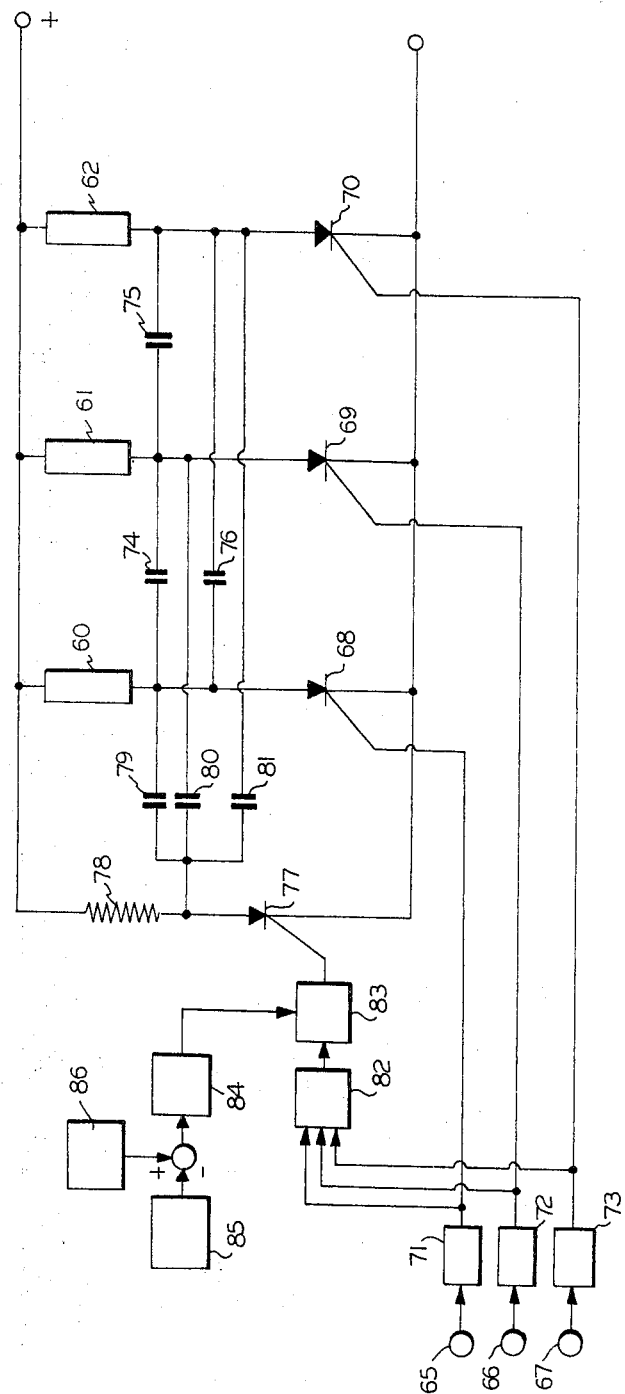
FIG. 4 is a circuit diagram of the connections of another embodiment of the direct current motor according to the invention.

The circuit of FIG. 4 shows another embodiment of this invention using uni-directional thyristors as gate controlled switching devices.

Figure 5:
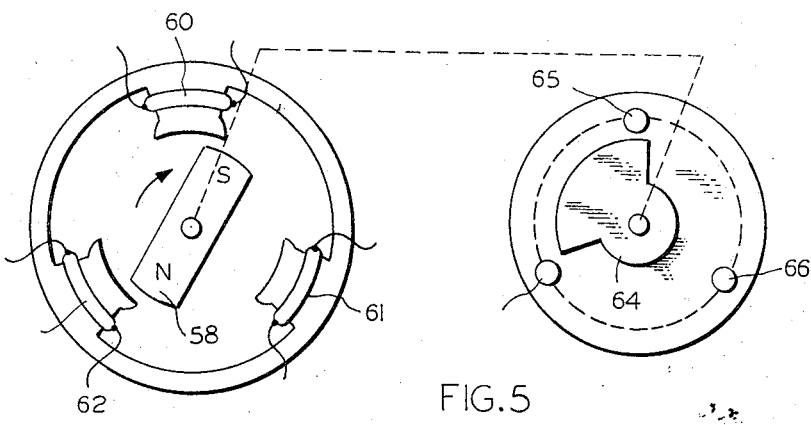
FIG. 5 shows the positional relationship between the rotor, windings, disc and energy transducers of the motor of FIG. 4.

FIG. 5 shows the positional relationship between the rotor, windings, disc and energy transducers for the circuit of FIG. 4.

Windings 60, 61 and 62 are energized one by one by gate controlled switching devices 68, 69 and 70 which are turned on by triggering signals coming through the differentiating circuits 71, 72 and 73 from transducers 65, 66 and 67 which are coupled to the disc 64, causing the rotor 58 to rotate continuously.

Gate controlled switching devices 68, 69 and 70 are turned off by electric capacitors 74, 75 and 76 and also by an auxiliary gate controlled switching device 77, resistor 78 and capacitors 79, 80 and 81 in a manner similar to that described in connection with the embodiment of FIGS. 1 and 2.

Furthermore, an automatic speed or phase control is achieved by the speed or phase detector 85, reference signal generator 86, amplifier 84, delaying circuit 83 and adding circuit 82 also in a manner similar to that described in connection with the embodiment of FIGS. 1 and 2.

A direct current motor of the kind described above has a very good and reliable commutating action achieved through purely electronic components, and is acceptable for automatic control system and industrial use.

It is a great advantage of the motor of this kind that the input power is easily controlled without any power dissipation by controlling the energizing time of the switching devices, and therefore it is available for any high power direct current motor control system.

What we claim is:

1. An electronically commutated direct current motor comprising;
   a rotor, said rotor being permanently magnetized,
   a plurality of stator windings,
   a plurality of pairs of gate controlled switching devices connected in series, said stator windings being connected to the connection points of said pairs of gate controlled switching devices,
   a set of capacitors, one connected in parallel with each of said windings,
   a plurality of energy transducers coupled to the respective gate controlled switching devices,
   a disc mechanically coupled to said rotor for rotation in synchronism therewith and coupled to said energy transducers in sequence as said disc rotates, said disc controlling the supply of a signal to the respective energy transducers,
   and control means including at least an auxiliary gate controlled switching device coupled to said gate controlled switching devices for turning off the gate controlled switching devices, and adding means and controllable time delay means coupled to each other and coupled between said energy transducers and said auxiliary gate controlled switching device for triggering said auxiliary gate controlled switching device by pulses obtained by processing the signals produced by said energy transducers through the adding means and the controllable time delay means.

2. An electronically commutated direct current motor comprising;
   a rotor, said rotor being permanently magnetized,
   a plurality of stator windings,
   a plurality of pairs of gate controlled switching devices connected in series, said stator windings being connected to the connection points of said pairs of gate controlled switching devices,
   a first set of capacitors, one connected in parallel with each of said windings,
   a plurality of energy transducers coupled to the respective gate controlled switching devices,
   a disc mechanically coupled to said rotor for rotation in synchronism therewith and coupled to said energy transducers in sequence as said disc rotates, said disc controlling the supply of a signal to the respective energy transducers,
   and control means including at least an auxiliary gate controlled switching device, a resistor, and a second set of capacitors, said auxiliary gate controlled switching device and said resistor being connected in series, one of said second set of capacitors being connected across the connecting point of said auxiliary gate controlled switching device and said resistor and the connecting point of each of said pairs of series connected gate controlled switching devices, and adding means and controllable time delay means coupled to each other and coupled between said energy transducers and said auxiliary gate controlled switching device for triggering said auxiliary gate controlled switching device by pulses obtained by processing the signals produced by said energy transducers through the adding means and the controllable time delay means.

3. An electronically commutated direct current motor comprising;
   a rotor, said rotor being permanently magnetized,
   a plurality of stator windings,
   a plurality of gate controlled switching devices, each of said stator windings being connected to one of said gate controlled switching devices,
   a set of capacitors, one being connected between each of the pairs of connection points of said gate controlled switching devices and said stator windings,
   a plurality of energy transducers coupled to the respective gate controlled switching devices,
   a disc mechanically coupled to said rotor for rotation in synchronism therewith and coupled to said energy transducers in sequence as said disc rotates, said disc controlling the supply of a signal to the respective energy transducers,
   and control means including an auxiliary gate controlled switching device coupled to said gate controlled switching devices for turning off the gate controlled switching devices, and adding means and controllable time delay means coupled to each other and coupled between said energy transducers and said auxiliary gate controlled switching device for triggering said auxiliary gate controlled switching device by pulses obtained by processing the signals produced by said energy transducers through the adding means and the controllable time delay means.

4. An electronically commutated direct current motor comprising;
   a rotor, said rotor being permanently magnetized,
   a plurality of stator windings,
   a plurality of gate controlled switching devices, each of said stator windings being connected to one of said gate controlled switching devices, a first set of capacitors, one connected between each of the pairs of connection points of said gate controlled switching devices and said stator windings, a plurality of energy transducers coupled to the respective gate controlled switching devices, a disc mechanically coupled to said rotor for rotation in synchronism therewith and coupled to said energy transducers in sequence, said disc controlling the supply of a signal to the respective energy transducers, and control means including an auxiliary gate controlled switching device, a resistor, and a second set of capacitors, said auxiliary gate controlled switching device and said resistor being connected in series, one of said second set of capacitors being connected across the connecting point of said auxiliary gate controlled switching device and said resistor and the connecting point of each of said pairs of series connected gate controlled switching devices, and adding means and controllable time delay means coupled to each other and coupled between said energy transducers and said auxiliary gate controlled switching device for triggering said auxiliary gate controlled switching device by pulses obtained by processing the signal produced by said energy transducers through the adding means and the controllable time delay means.

References Cited

UNITED STATES PATENTS

| | | | |
|---|---|---|---|
| 3,305,713 | 2/1967 | Ikegami | 318—138 |
| 3,374,410 | 3/1968 | Cronquist et al. | 318—254 |
| 3,392,318 | 7/1968 | Huntzinger | 321—45 |
| 3,419,782 | 12/1968 | Sheldrake et al. | 318—254 |
| 3,443,182 | 5/1969 | Graham | 318—138 |
| 3,449,654 | 6/1969 | Sheldrake et al. | 321—45 XR |

ORIS L. RADER, Primary Examiner

U.S. Cl. X.R.

318—254